(12) United States Patent
Butterfield et al.

(10) Patent No.: US 10,235,680 B2
(45) Date of Patent: Mar. 19, 2019

(54) SYSTEM AND METHOD FOR POPULATING A DATABASE WITH USER INPUT

(75) Inventors: Phil Butterfield, Marlow (GB); Karel Mette, Hamburg (DE); Allen Porter, St. Louis, MO (US)

(73) Assignee: Maritz Holdings Inc., Fenton, MO (US)

( * ) Notice: Subject to any disclaimer, the term of this patent is extended or adjusted under 35 U.S.C. 154(b) by 1067 days.

(21) Appl. No.: 13/291,523

(22) Filed: Nov. 8, 2011

(65) Prior Publication Data

US 2012/0124065 A1 May 17, 2012

Related U.S. Application Data

(60) Provisional application No. 61/413,188, filed on Nov. 12, 2010.

(51) Int. Cl.
*G06F 17/30* (2006.01)
*G06Q 30/02* (2012.01)

(52) U.S. Cl.
CPC ...... *G06Q 30/02* (2013.01); *G06F 17/30654* (2013.01)

(58) Field of Classification Search
CPC .................. G06F 17/30654; G06F 17/30684
USPC ....................................................... 707/755
See application file for complete search history.

(56) References Cited

U.S. PATENT DOCUMENTS

| | | | |
|---|---|---|---|
| 6,826,540 B1 * | 11/2004 | Plantec et al. | 705/7.32 |
| 7,620,567 B2 | 11/2009 | George et al. | |
| 2003/0120846 A1 * | 6/2003 | Clapper | G06F 17/30675 710/100 |
| 2004/0042506 A1 * | 3/2004 | Fallon | G06Q 40/04 370/521 |
| 2007/0106674 A1 * | 5/2007 | Agrawal et al. | 707/10 |
| 2008/0201322 A1 * | 8/2008 | Terayoko | G06F 17/30265 |

OTHER PUBLICATIONS

Listening to Customers Just Got Easier!, http://www.inmoment.com/press/listening-customers-just-got-easier, Feb. 10, 2015, 4 pages.

* cited by examiner

*Primary Examiner* — Mahesh H Dwivedi
*Assistant Examiner* — Johnese Johnson
(74) *Attorney, Agent, or Firm* — Stinson Leonard Street LLP

(57) ABSTRACT

System and methods for populating a database with information from users. A memory stores reference standards, reference keywords, and rules for the reference keywords. An on-line survey question relating to the product/service is presented to the users. Input is received from the users in response to the presented survey question and has content. The received input is stored in the database. A quantity of the content of the received input and a quality of the content of the received input is evaluated.

24 Claims, 10 Drawing Sheets

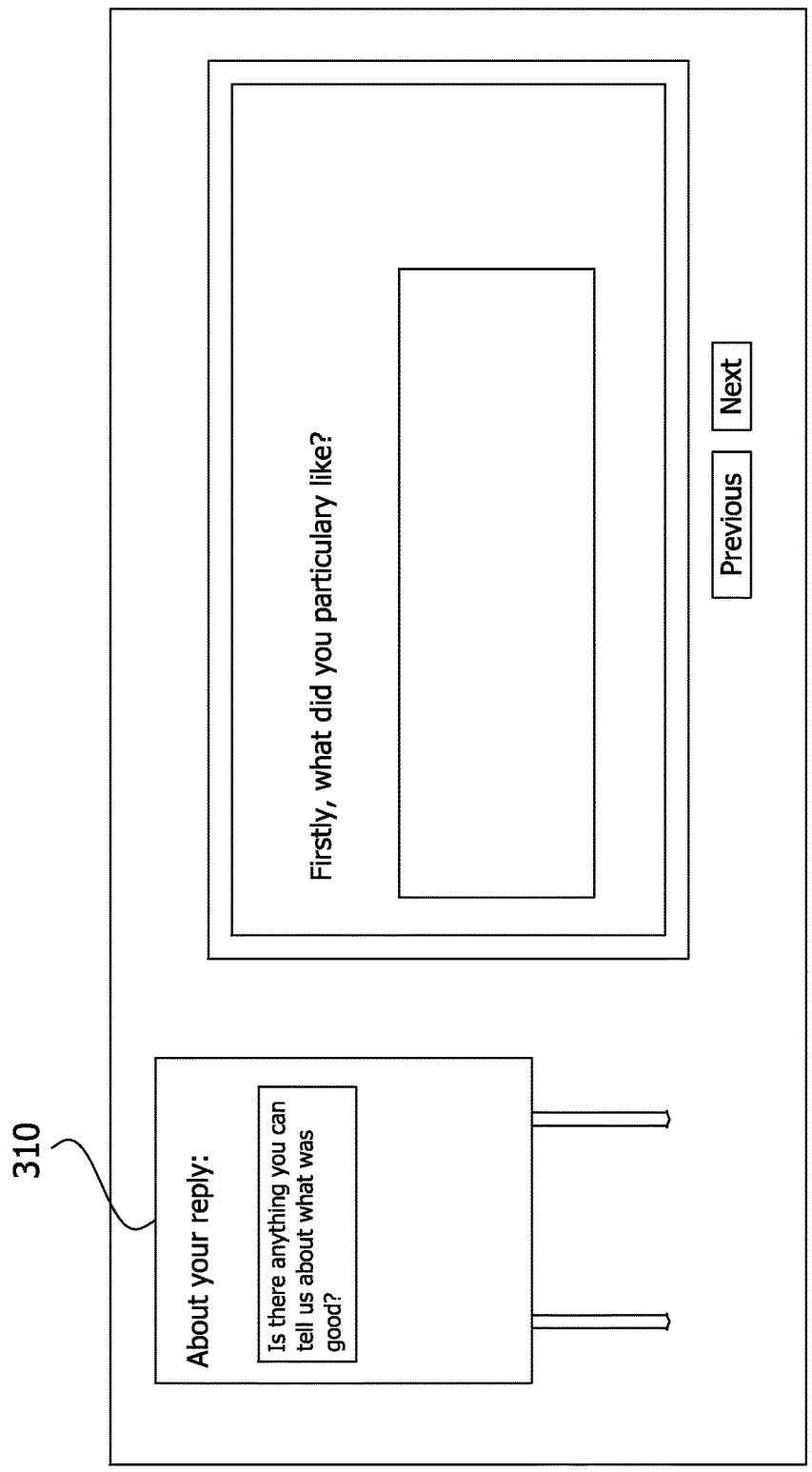

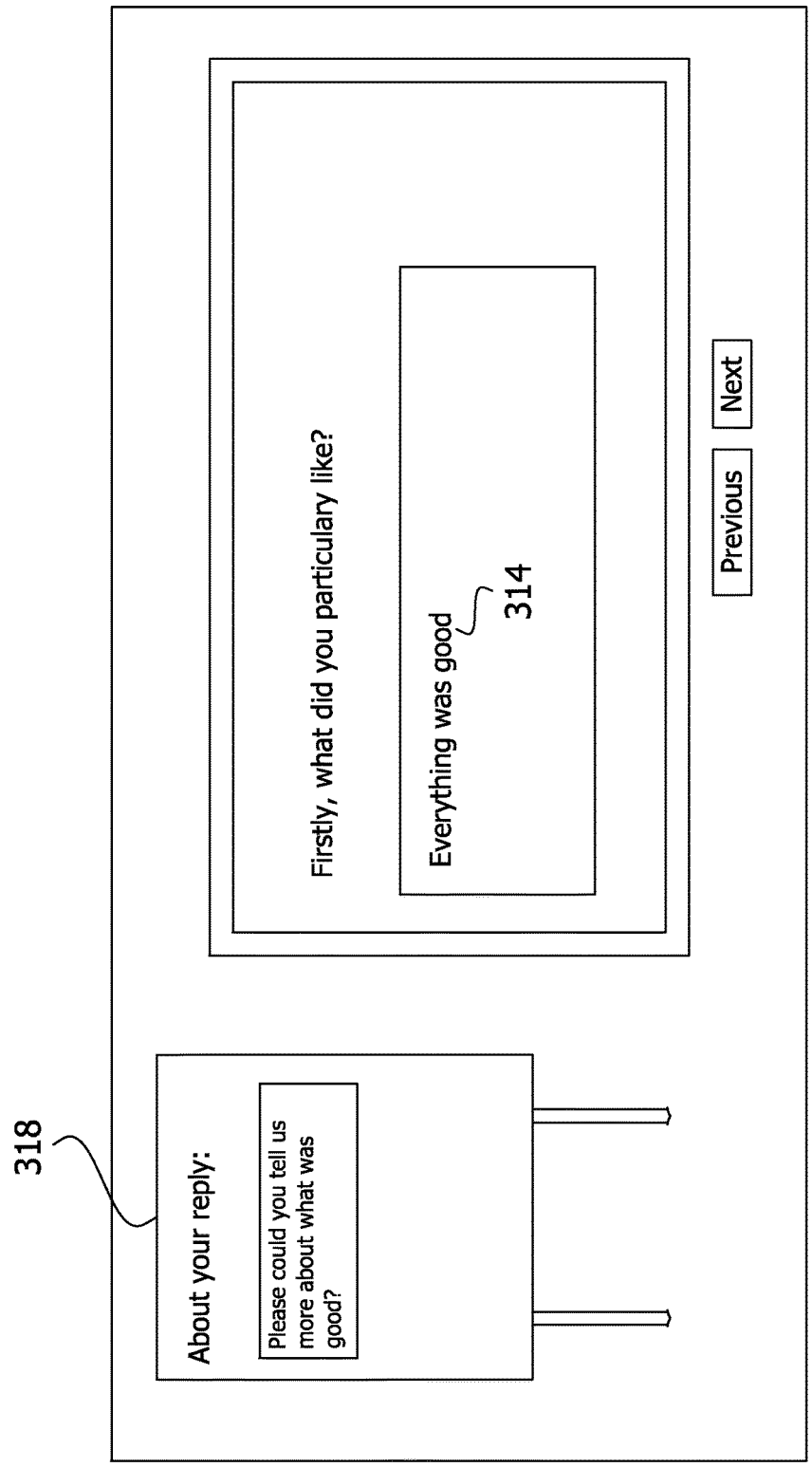

FIG. 3D

Firstly, what did you particulary like?

Everything was good. The people were friendly. It was easy to park and there were comfortable chairs in the waiting area. ~322

Previous  Next

FIG. 5C

Was there anything that happened at the collection that made it special for you?

510

The staff and price. I thought the people at the service desk were very friendly. When I had forgotten my coupon for the expensive repair, they offered to give me the rate without the coupon.

Previous | Finish Later | Next

SYSTEM AND METHOD FOR POPULATING A DATABASE WITH USER INPUT

FIELD OF THE INVENTION

The present invention generally relates to computer systems and methods for requesting user input regarding a product or service.

BACKGROUND OF THE INVENTION

Surveys have long been relied on as a structured, standardized means of collecting information, usually from a large population. Survey information is advantageously and increasingly used in various fields such as politics, social sciences, and marketing to provide information of statistical significance. And while surveys are considered robust barometers of popular opinion due to their large volumes, the data collected must be useful as well. Accordingly, it is desirable within the survey industry to connect with respondents using means that would maximize reach and yield useful information, yet economize data collection.

While initial surveys were largely (postal) mail based, these quickly gave way to telephone interviews with the widespread adoption of the telephone. Telephone surveys provide an interactive and somewhat personal experience for the interviewee with a human interviewer, and comprehension of answers is increased.

The advent and penetration of the Internet has quickly resulted in moving population surveys online. Almost 75% of US households, or approximately 228 million people, had internet access in 2009 (Nielsen Online). Hence, results of internet surveys are generally accepted as representative of a wide-cross section of the populace. Benefits of moving surveys online include ease of data creation and reporting, interactivity (HTML-based forms, for example), improved survey aids such as graphs and video, and inexpensiveness. A key drawback of internet-based surveys, however, is the loss of a personal or 'human' touch to the survey process. The respondent answers standard questions without any perceived effort on the part of the surveyor to understand the respondent's unique answers. There is hence a need to provide a more personalized experience while maintaining the benefits of online surveys.

SUMMARY OF THE INVENTION

According to an aspect of the invention, a method populates an input database with information from a plurality of users regarding a product/service provided to the users. Reference standards are stored in a reference database. The reference standards being about aspects of the product/service and defining parameters for content related to each said aspect. Questions relating to the aspects of the product/service provided to the users are stored. The method further includes presenting to the user an on-line survey including at least some of the stored questions and receiving input from the users in response to the presented on-line survey. The received input has content and is stored in the input database. The received input is parsed to determine its content, and the parsed content is evaluated to determine a quantity of data within the content relative to the reference standards. Finally the method includes requesting additional input from the user as a function of the determined quantity of data.

In an alternative or additional aspect of the invention, a method populates an input database with information from a plurality of users regarding a product/service provided to the users. The method includes storing the reference words in a reference database. The reference words being about aspects of the product/service and defining parameters for content related to each said aspect. The method stores questions relating to the aspects of the product/service provided to the users and further stores rules for the defined reference words in the reference database. The user is presented with an online survey including at least some of the stored questions. The method additionally includes receiving input from the users in response to the presented on-line survey question, said received input having content. The received input is stored in the input database and parsed to determine the content of the received input. The determined content is matched to the reference keywords. The method also includes determining one or more of the rules corresponding to the matched keywords and executing the determined rules to create a query. Additional input is requested from the user as a function of said matching and the created query.

According to another aspect of the invention, a system includes a reference database storing a plurality of reference standards, storing a plurality of reference keywords, storing a plurality of rules for the reference keywords, and storing a plurality of questions for users relating to aspects of a product/service provided to the users. The system also includes an input database storing received user input and a processor executing instructions for populating the database. The system further includes a computer readable non-transitory storage media storing the executable instructions for presenting to a user an on-line survey including at least some of the stored questions and receiving input from the users in response to the presented on-line survey. The received input has content and is stored in the input database. A quantity and a quality of the content of the received input are evaluated.

In another form, the invention comprises a computer readable nontransitory storage media storing executable instruction for use with a system comprising a reference database storing a plurality of reference standards, storing a plurality of reference keywords, storing a plurality of rules for the reference keywords, and storing a plurality of questions for users relating to aspects of a product/service provided to the users. The media is also for use with an input database storing received user input. The media is also for use with a processor for executing the executable instructions. The executable instructions stored on the computer readable nontransitory storage media comprise instructions for:

populating the input database with user input; presenting to a user an on-line survey including at least some of the stored questions;

receiving input from the users in response to the presented on-line survey, said received input having content;

storing the received input in the input database;

evaluating a quantity of the content of the received input; and evaluating a quality of the content of the received input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other objects and features will be in part apparent and in part pointed out hereinafter.

BRIEF DESCRIPTION OF THE DRAWINGS

FIGS. 3A-3D are exemplary screenshots illustrating operation of the process of FIG. 2 from a user perspective;

FIGS. 5A-5C are exemplary screenshots illustrating operation of the process of FIG. 4 from a user perspective;

Corresponding reference characters indicate corresponding parts throughout the drawings.

DETAILED DESCRIPTION

Figure 1:
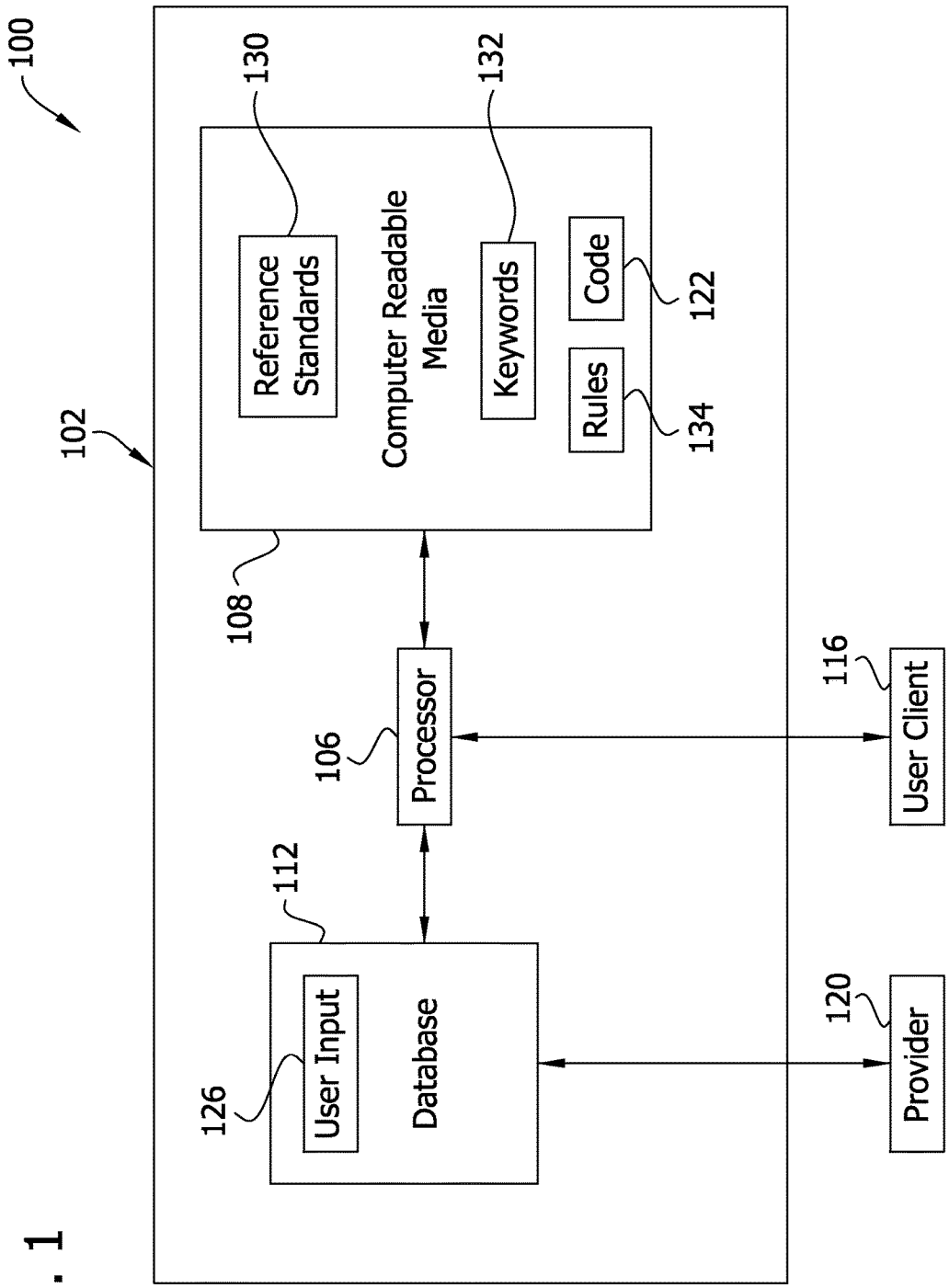
FIG. 1 is a block diagram illustrating an exemplary computing system of an embodiment of the present invention.

Embodiments of the invention overcome the limited interactivity of online surveys while receiving customer feedback. In particular, the invention is operable to provide an online survey to a user and receive user feedback. Additional user input is requested based on analysis of the received user feedback. Aspects of the invention such as shown in FIG. 1 include a processor to populate a database with user input, including any additional user input subsequent to the initial query, to enable a provider to modify product and/or service offerings based on such input. In one embodiment, the provider collects and analyzes input from a plurality of users before making any decisions on product/service modification.

In an embodiment, user input is evaluated by the processor quantitatively against one or more reference standards, and additional user input is requested if necessary. In an additional or alternative embodiment, user input is matched by the processor against one or more keywords, and based on the match, one or more rules are executed to generate request(s) for additional user input if necessary.

FIG. 1 is a block diagram illustrating a system 100 for surveying a user according to an embodiment of the invention. The system 100 includes a computing device 102 including a processor 106, a reference database memory area 108, and a user input database 112. Although memory area 108 and database 112 are illustrated as separate, it is also contemplated that the memory area 108 and the database 112 may be combined into a single database memory.

The processor 106 may be a central processing unit (CPU) or a collection of CPUs, and the memory area 108 may be a volatile or nonvolatile computer-readable medium or computer-readable storage area for storing data. In one example, the memory area 108 and database 112 may be remote with respect to the processor 106 and/or the computing device 102, and the computing device 102 and/or the processor 106 may wirelessly or via wire access the memory area 108 and the database 112.

For example, the computing device 102 may be a computer, a computer server, a web server, or a collection of computing devices that interacts with a user of a client device 116 via a communications network (not shown) to present the online survey and receive input. The computing device 102 also interacts with a device 120 of a provider to receive input from the provider and to provide the user's input to the provider. The client device 116 and the provider device 120 are not necessarily in a client-server relationship with any other computing device. In one example, the communications network may be a computer network, an intranet, an internet, the Internet, or the like. The communications network may also be a network channel for facilitating any communication between two computing devices. Additional software components such as scripts and other interfaces may be present on the computing devices to facilitate crosstalk. The client device 116 and the provider device 120 may be a computer, a personal digital assistant, a cellular phone, a portable digital music player, a gaming console, or other computing device. For example, the client device 116 may be a computer workstation for a user who is a consumer of a product or service offering.

In an embodiment, the memory area 108 stores executable code 122 such that when executed by the processor 106, code 122 generates an online survey that is presented to the user via client device 116. The survey may be presented in any suitable form, via a web browser for example. Responses provided by the user, or user input 126, is stored to database 112. Memory area 108 further stores a plurality of reference standards 130 which may be provided by the provider 120 for quantitative comparison against the user input 126. To perform the comparison, the processor 106 reads, parses, or otherwise analyzes the user input 126. In an exemplary embodiment, the processor 106 evaluates one or more of a string length of the user input, a word count of the user input, a letter count of the user input, a byte count of the user input, or a space count (i.e. spaces between words) of the user input. Other means of evaluating data quantity in the user input are within the scope of the invention. Accordingly, in one embodiment, the reference standards are desirable and/or pre-specified values of data quantity, such as a minimum string length, a minimum word count, a minimum byte count, and so on.

A 'word' may be a sequence of symbols chosen from a set or alphabet to define a smallest free form of a language. In an embodiment, processor 106 accesses a dictionary (not shown) to determine word count while evaluating user input 126, and only accounts for words in the user input that are also present in the dictionary. Desirably, potential misspellings by the user such as 'staf' vs. 'staff', 'service' vs. 'service' and so on, are automatically corrected and accounted for in the word count. A word may also refer to a string that is simply a concatenation of characters without any meaning. Alternatively, a word may refer to a computing unit that is a fixed size/group of bits handled as a unit by system 100 and/or processor 106.

The processor compares the analyzed input 126 against the reference standard(s) 130 to determine whether additional user input is needed. In one embodiment, the reference standard 130 is used as a minimum or lower threshold for the evaluated user input. In an additional or alternative embodiment, processor 106 determines a language of the input, selects a reference standard 130, and optionally selects a dictionary, to apply based on the determined language. For example, if the determined language is English, the corresponding minimum threshold may be 15 words, whereas if the determined language is Chinese, the corresponding minimum threshold is 4 words.

If the evaluated input does not meet the minimum threshold, code 122 generates a request for additional input from the user.

Memory area 108 further stores keywords 132 that represent terms of interest to the product/service provider for further querying. Additionally, keywords 132 may also include escape words such as 'no' or 'nothing' that a user may employ to bypass the question. To perform the qualitative comparison, processor 106 reads, parses, analyzes or otherwise determines the content of user input 126. The determined content (also denoted by reference 126 for simplicity) is evaluated against the keywords 132 to see if it contains or matches, in part or whole, the determined content 126. Any approach may be used to match the content 126 to the keywords 132, such as natural language processing, artificial intelligence, etc. More adaptive techniques such as text mining/analytics may also be implemented for converting the text into analyzable data. Memory area 108 also stores rules 134 that correspond to the keywords 132, and the rules define the structure for further user input based on the keywords that match the determined content 126. In an embodiment, keywords 132 and the corresponding rules 134 are stored in a lookup table. In another embodiment, each rule is stored in a node of a hierarchical tree of rules based on the keyword(s) 132 it corresponds to. The hierarchy of rules may vary based on a particular survey design. A non-limiting example would be using an order of importance of keywords as a way to determine rules. By using the order of importance, a specific keyword or multiple keywords may be determined as keywords of importance which take precedence for probing. In an additional or alternative embodiment a last used keyword is determined and ranked against a list of keywords to determine if enough probing has taken place with that last used keyword. If not, then the last used keyword will be probed. In other embodiments, certain words may be deemed words of interest, such as legal words (e.g. 'lemon law', 'recall', 'faulty brake system', and so on) which would indicate alerts in a verbatim comment and would necessarily be probed by further questions and/or analysis. A single rule may correspond to multiple keywords, and vice versa.

In an embodiment, a rule specifies the format and content for a request for additional input, such as a request posed to the user for additional clarification. In an additional embodiment, the rule specifies what type of subsequent analysis (quantitative and/or qualitative) the additional input will be subjected to. For example, if it is deemed that a short comment will suffice in response, the rule may specify quantitative analysis. While disclosed for purposes of qualitative analysis, rules may be implemented independent of keywords for quantitative analysis as well. For example, if quantitative analysis follows qualitative analysis, a rule may be executed to analyze how many characters the user added, and pass this information onto the subsequent quantitative analysis routine.

Survey code 122 is operable to select a subset of matched keywords for further querying. The subset may be randomly selected from matched keywords. Alternatively, the processor 106 maintains a selection frequency or history of each of the keywords 132, and the subset of keywords is selected based on the selection frequency of each matched keyword. In one embodiment, matched keywords with lower selection frequency are selected for inclusion in the subset over matched keywords with higher selection frequency. Other approaches of generating the subset of matched keywords are within the scope of the invention. The request for additional input based on performing the qualitative comparison indicates the matched keywords 132 to the user, and requests the user to further address the subject of the indicated keywords 132.

In one embodiment, user input is repeatedly analyzed and additional input repeatedly requested until necessary (e.g. till the reference standards are met). Additionally, input at any stage may be evaluated quantitatively, or qualitatively, or both. In a real-world scenario, system 100 usually has no indication of the user's sentiment at the beginning of the survey, so the initial input may be quantitatively evaluated till sufficient input (minimum number of words, etc.) is received. From this point onwards, any additional input may be qualitatively evaluated at least once. In another embodiment, the user input is both quantitatively and qualitatively evaluated till a matched keyword is located in the user input, at which point additional input requests are based on the matched keyword (i.e. qualitative comparison). In yet another embodiment, if the survey detects a new keyword during qualitative evaluation, further input may be quantitatively evaluated until the user has provided sufficient additional input pertaining to the newly detected keyword. Indeed, any combination of evaluation method (qualitative, quantitative) may be applied to any received user input and may form the basis for requesting additional input, and is within the scope of this invention.

User input 126 at each step is stored in the database 112. The provider or a provider device 120 may access database 112 to retrieve stored input 126, and use the input as feedback to modify the product or service offering.

Figure 2:
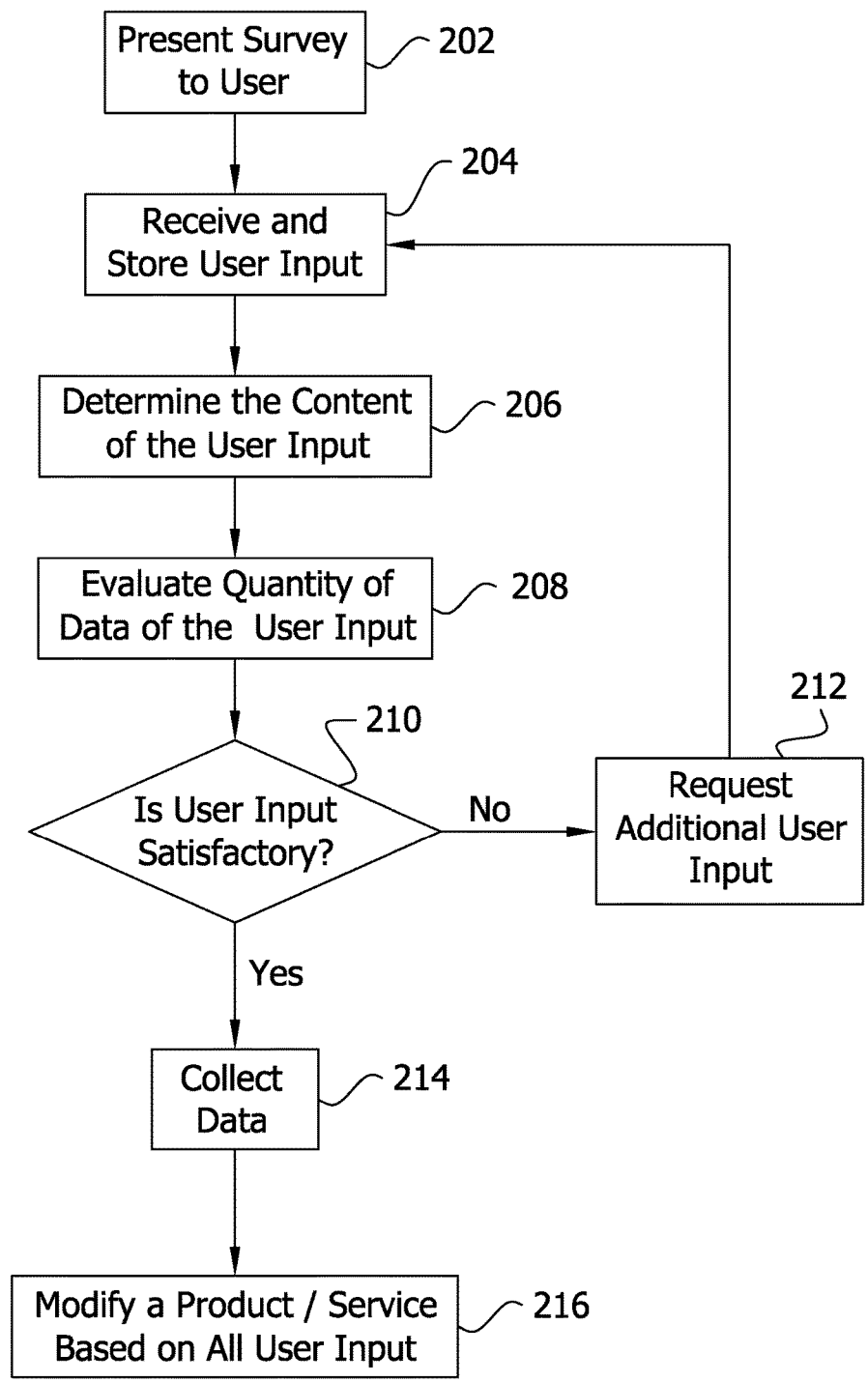
FIG. 2 is a flow diagram illustrating a process according to one embodiment of the invention for quantitative comparison/evaluation of user input.

FIG. 2 illustrates a method of quantitatively evaluating user input, starting with the survey itself, primarily from the perspective of the processor 106 executing instructions. Prior to presenting a survey to the user at 202, the processor stores reference standards in the database memory. The reference standards comprise aspects of the product/service and define parameters for content related to each aspect. In addition, the processor stores questions relating to the aspects of the product/service provided to the users. Frequently, the standards and questions are provided by the provider 120.

At 202, a survey is presented to the user. The user input is received and stored in database 112 at 204. The content of the user input is determined at 206 by parsing, reading or otherwise analyzing the input 126. At 208, a measure or quantity of data of the user input is evaluated. In one embodiment, the processor parses the received input to determine its content and evaluates the parsed content to determine a quantity of data within the content relative to the reference standards. The measure or quantity may include a string length of the user input, a word count of the user input, a letter count of the user input, a byte count of the user input, or a space count (i.e. spaces between words) of the user input. It is determined, at 210, if the user input is satisfactory. This involves comparing the user input to reference standards as discussed earlier. If the user input is deemed unsatisfactory, a request for additional input is generated and presented at 216 as a function of the determined quantity of data. Steps 204-210 repeat until the entire received user input is deemed satisfactory. At that point, a provider collects the stored user input at 214 and may modify a product or service offering at 216.

Figure 3A:
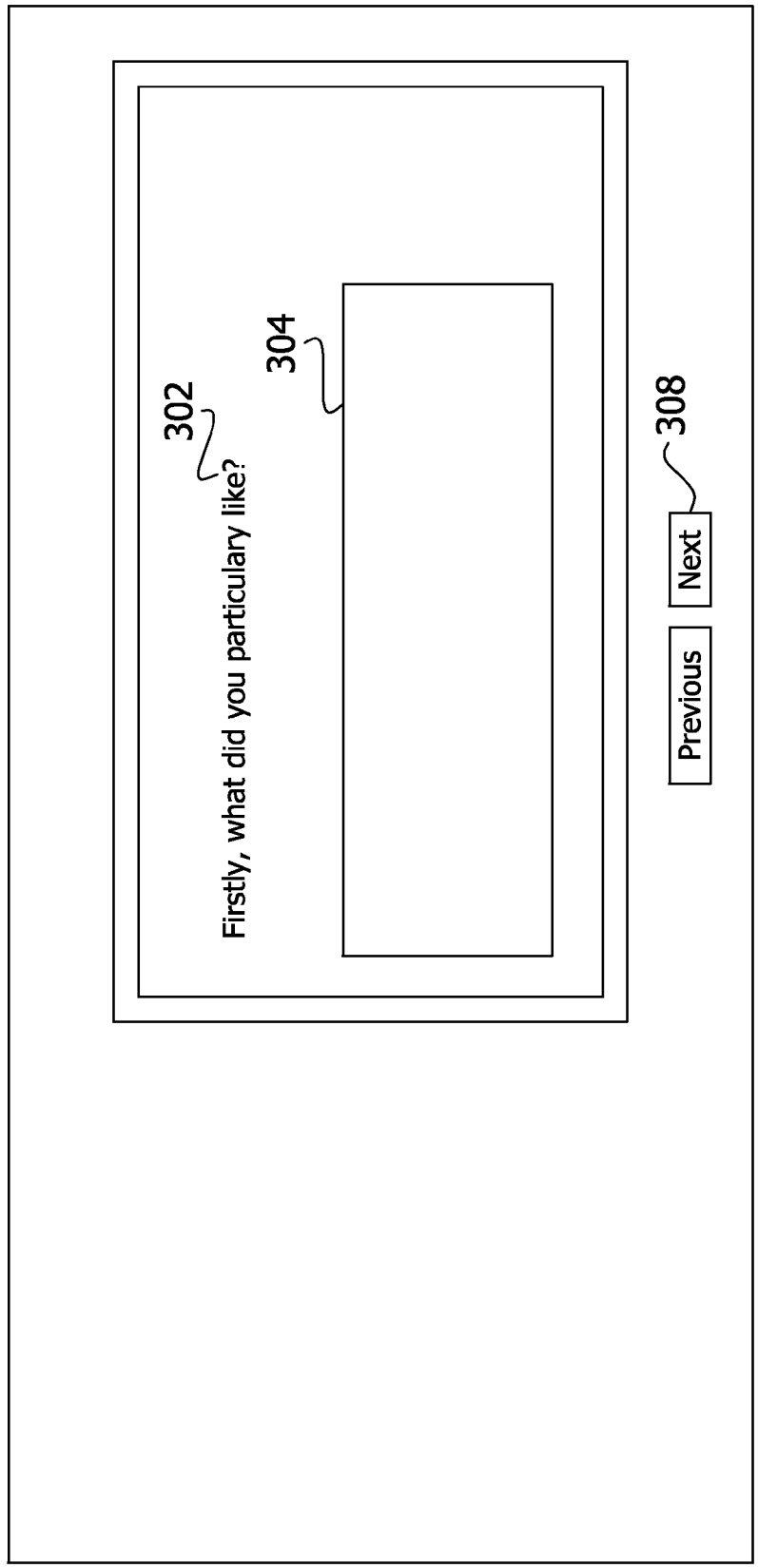

FIGS. 3A-3D illustrate a non-limiting example of the quantitative comparison approach of FIG. 2. In an embodiment, FIGS. 3A-3D follow from a user response to a question (not shown) such as "Overall, how satisfied were you with the service?" and selects the high end of a five-point rating scale, for example. A follow up survey question 302 is presented (FIG. 3A) to ascertain what contributed to the user's positive experience. In this example, the user does not enter a response in response box 304, and attempts to proceed via control 308. The survey then repeats the request in the next screen (FIG. 3B), this time adding a request 310 for additional input. FIG. 3C illustrates a screenshot after the user has entered a response 314 and the code 122 has deemed the response to still not be satisfactory. Accordingly, another request 318 for additional input is displayed to the user. FIG. 3D illustrates benefits of the invention, where the user finally provides detailed input 322 about his/her experience.

Figure 4:
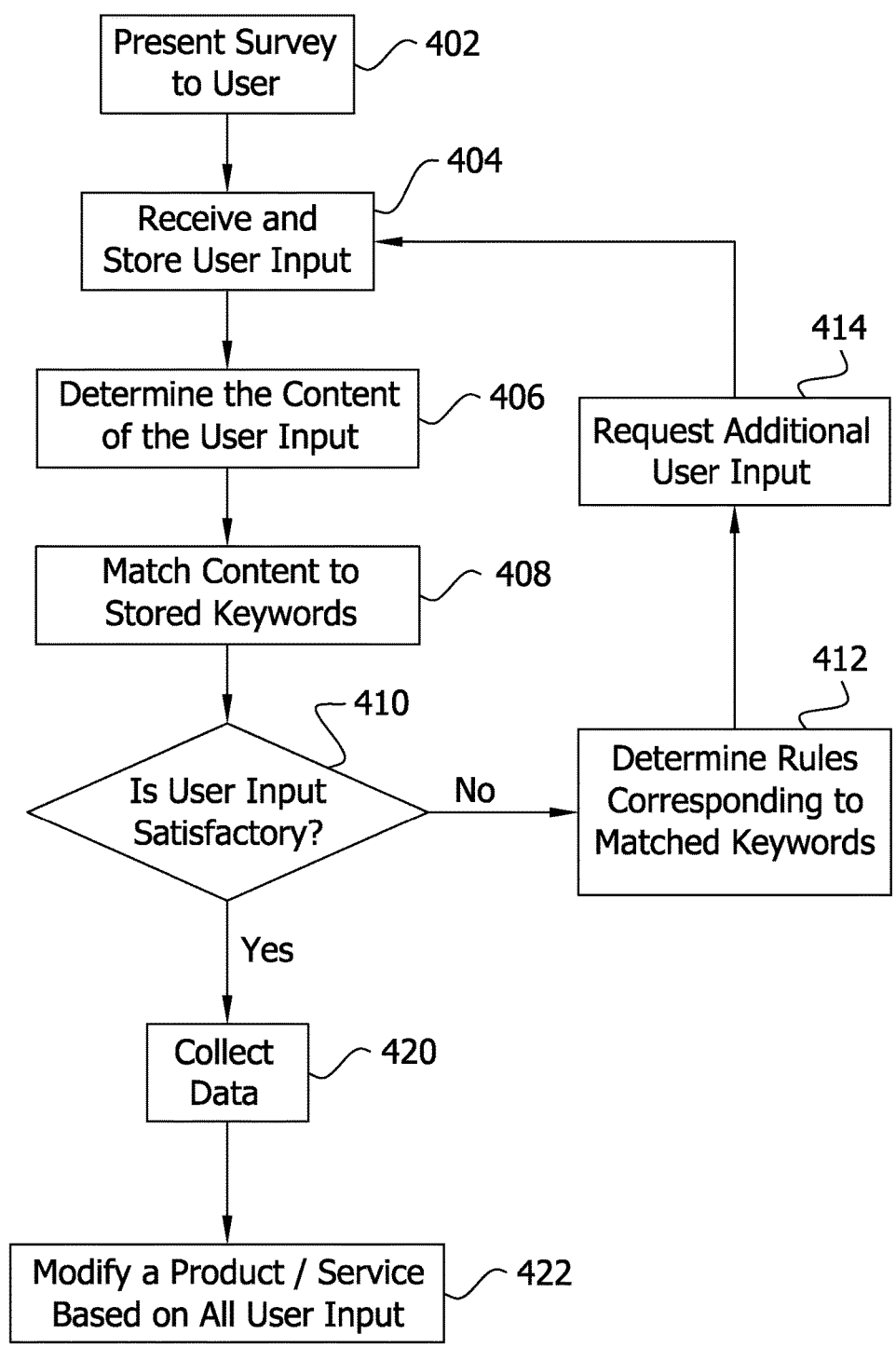
FIG. 4 is a flow diagram illustrating a process according to one embodiment of the invention for qualitative comparison/evaluation of user input.

FIG. 4 illustrates a method qualitatively evaluating user input upon initialization of the survey from the perspective of the processor 106. Prior to presenting a survey to the user at 402, the processor stores reference words in the database memory. The reference words comprise aspects of the product/service and define parameters for content related to each aspect. In addition, the processor stores questions relating to the aspects of the product/service provided to the users. Frequently, the reference words and questions are provided by the provider 120.

At 402, a survey is presented to the user. The user input is received and stored in database 112 at 404. In an embodiment, user input from each unique user is stored in a separate input file in database 112, though other structures for input storage are within the scope of the invention. The content of the user input is determined at 406 by parsing, reading or otherwise analyzing the input 126. The determined content is compared against stored keywords 132 to generate a listing of one or more matched keywords at 408. Any approach may be used to match the determined content to the stored keywords 132, such as natural language processing, artificial intelligence, etc. Text mining/analytics may also be employed to generate data from text that is more amenable to such analysis. It is determined, at 410, if the user input is satisfactory. This involved determining if a user has provided sufficient input for any matched keywords. If the user input is deemed unsatisfactory, rules 134 corresponding to the matched keywords are determined at 412, and used to generate a request for additional user input at 414. Steps 404-410 then repeat until the entire received user input is deemed satisfactory. A provider collects the stored user input at 420 to modify a product or service offering at 422. In an embodiment, the provider collects input files from database 112 and runs them through a provider-designed system for further analysis and classification.

Figure 5A:
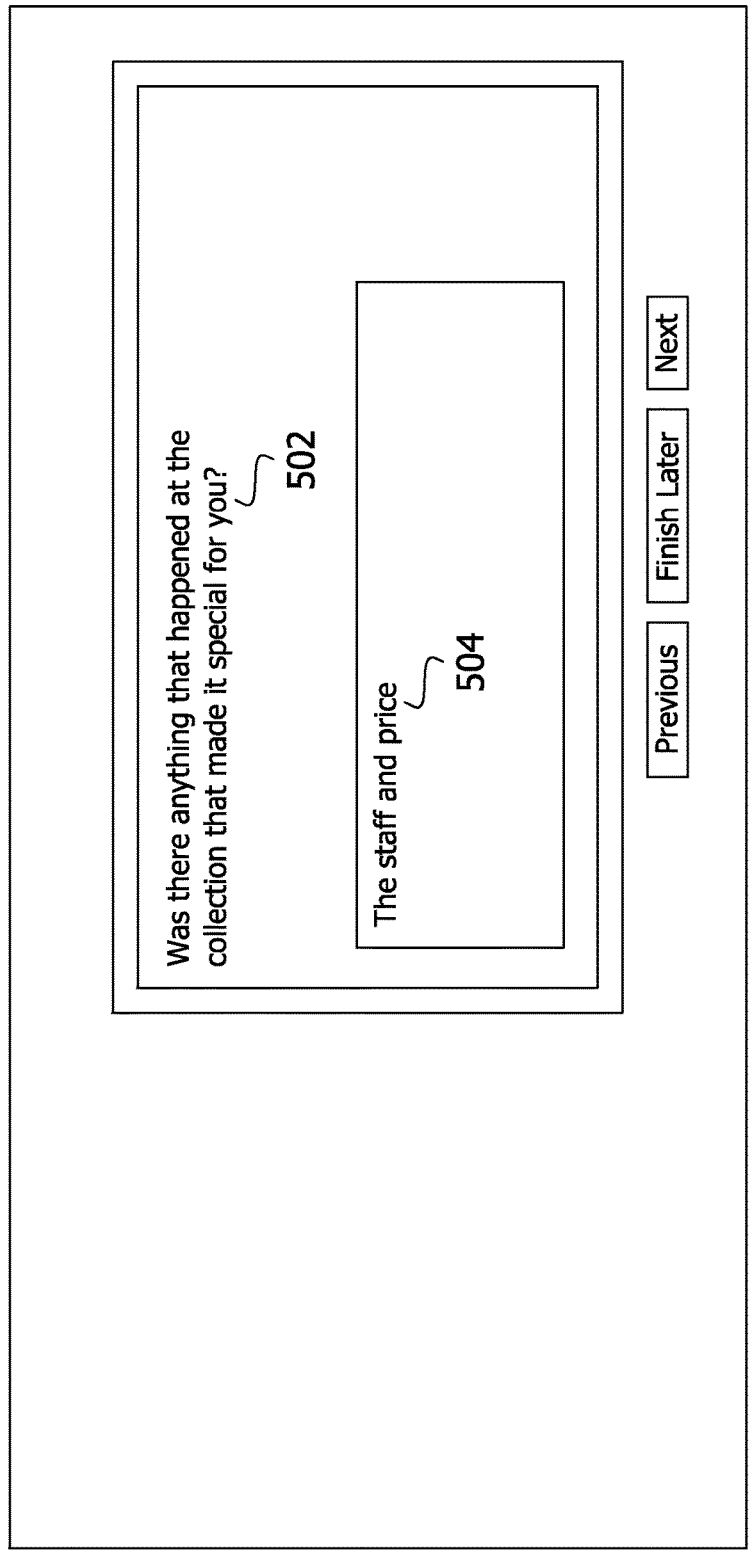
Figure 5B:
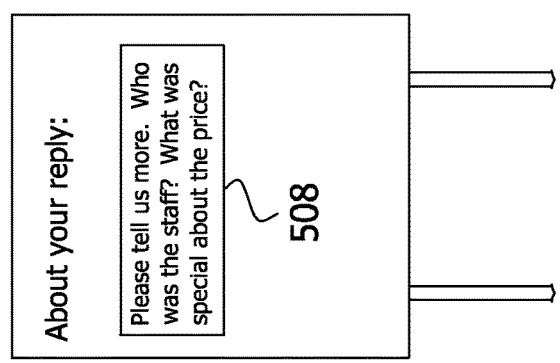

FIGS. 5A-C illustrate a non-limiting example of the qualitative comparison approach of FIG. 4. A survey question 502 is presented (FIG. 5A) to ascertain what contributed to the user's positive experience, and user input 504 is received. In this example, the user enters a response that contains keywords 'staff' and 'price', both of which match stored keywords 132. One or more rules are used to generate a request 508 for additional input (FIG. 5B). In this example, the user is queried about staff names, as well as the specifics on the price. It is within the scope of the invention, however, that the user be questioned further about one of the matched keywords, not both. FIG. 5C illustrates a screenshot after the user has entered a detailed response 510, which may then be employed to provide feedback to the staff and/or modify any price offerings.

The above summary is provided to introduce a selection of concepts in simplified form that are further described below in the Detailed Description. The summary is not intended to identify key features or essential features of the claimed subject matter, nor is it intended to be used as an aid in determining the scope of the claimed subject matter.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of data and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or servers may execute the computer-executable instructions such as those illustrated herein to implement aspects of the invention.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

The Abstract and summary are provided to help the reader quickly ascertain the nature of the technical disclosure. They are submitted with the understanding that they will not be used to interpret or limit the scope or meaning of the claims.

What is claimed is:

1. A computer implemented method executed by a processor for populating an input database with information from a plurality of users regarding a product or service provided to the users, said method comprising:
   storing by the processor minimum reference standards and reference keywords in a reference database, said minimum reference standards regarding aspects of the product or service and defining text parameters for content related to each said aspect;
   storing by the processor questions relating to the aspects of the product or service provided to the users;
   presenting to the users by the processor an on-line survey including at least some of the stored questions;
   receiving by the processor textual input from the users in response to the presented on-line survey, said received textual input having content;
   storing by the processor the received textual input in an input file unique to each of the users in an input database;
   parsing by the processor the received textual input stored in each unique input file to determine a quantity of data in its content and to determine data text parameters comprising words or phrases in its content;
   evaluating by the processor the parsed content and determining by the processor whether the quantity of data within the content is less than the minimum reference standards;
   evaluating by the processor the parsed content and determining whether the data text parameters within the content match the stored key words by comparing words or phrases in the content against stored reference keywords to generate a listing of one or more matched keywords relative to the reference keywords;
   in response to the determined quantity of data stored in the input file unique to each of the one or more users, first requesting by the processor additional quantity textual input from one or more of the users by sending a first communication to the user including a first question when the determined quantity of the received textual input is less than the minimum reference standards; and
   in response to the determined data text parameters stored in the input file unique to each of the one or more users, second requesting by the processor further textual input from the one or more users when the received textual input includes at least one matched reference keyword;
   wherein said second requesting in response to the determined data text parameters further comprises requesting the one or more users to provide additional textual user input relating to the at least one matched reference keyword by sending a second communication to the one or more users including a second question or request which includes the at least one matched reference keyword, wherein the second question is different than the first question;
   wherein the second requesting in response to the determined data text parameters further comprises requesting the one or more users to provide additional textual user input relating to the at least one matched keyword in order to obtain additional textual user input relating to the matched keywords so that the requested further textual input is different as compared to the received textual input; and
   wherein the determined quantity of data of the first requesting is one or more of the following: a string length of the received textual input, a word count of the received textual input, a byte count of the received textual input, and a space count of the received textual input.

2. The method of claim 1, further comprising modifying one of the aspects of the product or service in response to the determined quantity of data or in response to the determined data text parameters.

3. The method of claim 1, wherein the received input is empty, and said requesting additional quantity textual input specifies that the one or more users must provide input.

4. The method of claim 1, further comprising:
   additionally parsing by the processor received additional quantity textual input from the first communication or received further textual input from the second communication to determine a quantity of data in its content and to determine data text parameters comprising words or phrases in its content;
   evaluating by the processor the additionally parsed content and determining by the processor whether the quantity of data within the additionally parsed content is less than the minimum reference standards; and
   evaluating by the processor the additionally parsed content and determining whether the data text parameters within the additionally parsed content match the stored key words by comparing words or phrases in the content against stored reference keywords to generate a listing of one or more matched keywords relative to the reference keywords.

5. The method of claim 1, further comprising at least one of the following:
wherein said parsing further comprises determining a language of the received textual input, and wherein the received textual input from the users is evaluated in response to the determined language.

6. The method of claim 1, further comprising at least one of the following:
wherein the determined quantity of data is a byte count of the received textual input, and the minimum reference standard is a minimum value of said byte count; and
wherein the determined quantity of data is a space count of the received textual input, and the minimum reference standard is a minimum value of said space count.

7. The computer implemented method of claim 1,
wherein the processor stores in the reference database a plurality of rules for the reference keywords, and further comprising:
determining by the processor a rule of the plurality of rules, said determined rule corresponding to the matched keywords; and
executing by the processor the determined rule to generate the request for additional textual input;
said executing the determined rule further comprising:
selecting by the processor a subset of the matched keywords; and
generating by the processor the request for additional textual input based on the selected subset of matched keywords.

8. The method of claim 7, wherein said selecting by the processor is a function of one or more of the following: a random choice, and a selection frequency of each of the matched keywords.

9. The method of claim 7, further comprising dynamically generating by the processor an image of the text of the generated request for additional textual input.

10. A computer implemented method executed by a processor for populating an input database with textual information from a plurality of users regarding a product or service provided to the users, said method comprising:
storing by the processor a plurality of reference words in a reference database, said reference words regarding aspects of the product or service and defining text parameters for content related to each said aspect;
storing by the processor questions relating to the aspects of the product or service provided to the users;
storing by the processor rules for the defined reference words in the reference database;
presenting to a user of the plurality thereof by the processor an online survey including at least some of the stored questions;
receiving by the processor textual input from the user in response to the presented on-line survey question, said received textual input having content;
storing by the processor the received textual input in an input file unique to the user in an input database;
parsing by the processor the received textual input stored in the unique input file to determine to determine data text parameters comprising words or phrases in the content of the received input;
matching by the processor the data text parameters comprising words or phrases to the reference words;
determining by the processor one or more of the rules corresponding to the matched reference words, wherein the rules define the structure for further textual user input based on the matched determined content;
executing by the processor the determined rules to create a query; and
requesting by the processor further textual input from the user in response to said matched reference words and the created query when the received textual input includes at least one matched reference word;
wherein requesting in response to the matched reference words and the created query further comprises requesting the user to provide additional textual user input relating to the at least one matched reference keyword by sending a communication to the one or more users including a question or request which includes the at least one matched reference keyword; and
wherein the requesting in response to the matched reference words and the created query further comprises requesting the user to provide additional textual user input relating to the at least one matched keyword in order to obtain additional textual user input relating to the matched determined content so that the requested further textual input is different as compared to the received textual input;
further comprising dynamically generating by the processor an image displaying the text of the generated request for additional textual input.

11. The method of claim 10, further comprising modifying the product or service in response to the determined content and the matching.

12. The method of claim 10, further comprising:
receiving by the processor additional textual input from the user in response to the request for further textual input, said received additional textual input having additional content;
storing by the processor the received additional textual input in the input database;
parsing by the processor the received additional textual input to determine the additional content of the received additional textual input; and
modifying by the processor the product or service in response to the determined content of the received textual input and the determined additional content of the additional textual input.

13. The method of claim 10, said executing the determined rules further comprising:
selecting by the processor a subset of the matched words; and
generating by the processor the request for additional textual input based on the selected subset of matched words.

14. The method of claim 13, wherein said selecting is a function of one or more of the following: a random choice, and a selection frequency of each of the matched words.

15. A system comprising:
a reference database storing a plurality of minimum reference standards, storing a plurality of reference keywords, storing a plurality of rules for the reference keywords, and storing a plurality of questions for users relating to aspects of a product or service provided to the users;
an input database having input files unique to each of the users storing received user input;
a processor configured for executing executable instructions; and a computer readable nontransitory storage media storing said executable instructions for execution by the processor, said executable instructions comprising instructions for:

populating the unique input files of the input database with textual user input;

presenting to a user an on-line survey including at least some of the stored questions;

receiving textual input from the user in response to the presented on-line survey, said received textual input having content;

storing the received textual input in the input file unique to the user in the input database;

evaluating a quantity of the content of the received textual input stored in the unique input file based on the minimum reference standards wherein the determined quantity of the received textual input is less than the minimum reference standards; and evaluating data text parameters of the content of the received textual input stored in the unique input file, wherein the instructions for evaluating data text parameters further comprise instructions for:

parsing by the processor the received textual input stored in each unique input file to determine a quantity of data in its content and to determine data text parameters comprising words or phrases in its content;

evaluating by the processor the parsed content and determining by the processor whether the quantity of data within the content is less than the minimum reference standards;

evaluating by the processor the parsed content and determining whether the data text parameters within the content match the stored key words by comparing words or phrases in the content against stored reference keywords to generate a listing of one or more matched keywords relative to the reference keywords;

in response to the determined quantity of data stored in the input file unique to each of the one or more users, first requesting by the processor additional quantity textual input from one or more of the users by sending a first communication to the user including a first question when the determined quantity of the received textual input is less than the minimum reference standards; and in response to the determined data text parameters stored in the input file unique to each of the one or more users, second requesting by the processor further textual input from the one or more users when the received textual input includes at least one matched reference keyword;

wherein said second requesting in response to the determined data text parameters further comprises requesting the one or more users to provide additional textual user input relating to the at least one matched reference keyword by sending a second communication to the one or more users including a second question or request which includes the at least one matched reference keyword, wherein the second question is different than the first question;

wherein the second requesting in response to the determined data text parameters further comprises requesting the one or more users to provide additional textual user input relating to the at least one matched keyword in order to obtain additional textual user input relating to the matched keywords so that the requested further textual input is different as compared to the received textual input; and wherein the determined quantity of data of the first requesting is one or more of the following: a string length of the received textual input, a word count of the received textual input, a byte count of the received textual input, and a space count of the received textual input.

16. The system of claim 15 wherein said instructions for evaluating quantity comprise instructions for:

determining by the processor one or more rules from the plurality of rules within the reference database corresponding to the matched one or more keywords; and requesting by the processor additional textual input from the user in response to said matching and the determined one or more rules.

17. The method of claim 10, wherein requesting further textual input from the user further comprises requesting further textual input that has not been previously provided.

18. The method of claim 17, wherein requesting further textual input that has not been previously provided further comprises requesting new textual input.

19. The method of claim 18, wherein requesting new further textual input further comprises requesting further textual input that addresses the subject of the matched reference words.

20. The method of claim 19, wherein the determined rules specify a content for a request for additional textual inputs.

21. The method of claim 1 wherein the determined quantity of data is a string length of the received textual input and the minimum reference standard is a minimum value of said string length.

22. The method of claim 1 wherein the determined quantity of data is a word count of the received textual input and the minimum reference standard is a minimum value of said word count.

23. The method of claim 1 wherein the determined quantity of data is a byte count of the received textual input and the minimum reference standard is a minimum value of said byte count.

24. The method of claim 1 wherein the determined quantity of data is a space count of the received textual input and the minimum reference standard is a minimum value of said space count.

* * * * *